United States Patent [19]
Rieder et al.

[11] Patent Number: 5,253,430
[45] Date of Patent: Oct. 19, 1993

[54] LENGTH MEASURING SYSTEM

[75] Inventors: Heinz Rieder, Oberndorf; Max Schwaiger, Ostermiething, both of Austria

[73] Assignee: RSF-Elektronik Gesellschaft m.b.H., Tarsdorf, Austria

[21] Appl. No.: 766,804

[22] Filed: Sep. 26, 1991

[30] Foreign Application Priority Data

Oct. 2, 1990 [AT] Austria ................................ 1981/90

[51] Int. Cl.$^5$ ................................................ G01B 7/02
[52] U.S. Cl. ................................... 33/702; 33/704; 33/706
[58] Field of Search ................. 33/702, 703, 704, 706, 33/707, 708

[56] References Cited

U.S. PATENT DOCUMENTS

| | | | |
|---|---|---|---|
| 4,160,328 | 7/1979 | Ernst | 33/706 |
| 4,170,826 | 10/1979 | Holstein | 33/702 |
| 4,554,741 | 11/1985 | Affa | 33/702 |
| 4,776,098 | 10/1988 | Nelle | 33/702 |
| 4,912,856 | 4/1990 | Ernst | 33/702 |
| 5,050,311 | 9/1991 | Nelle | 33/704 |

FOREIGN PATENT DOCUMENTS

| | | | |
|---|---|---|---|
| 0118607 | 9/1984 | European Pat. Off. | 33/704 |
| 110059 | 12/1987 | European Pat. Off. | |
| 2643304 | 4/1978 | Fed. Rep. of Germany. | |
| 2853771 | 6/1980 | Fed. Rep. of Germany. | |
| 2911047 | 10/1980 | Fed. Rep. of Germany | 33/702 |
| 0224655 | 7/1985 | German Democratic Rep. | 33/704 |

*Primary Examiner*—Thomas B. Will
*Attorney, Agent, or Firm*—Collard & Roe

[57] ABSTRACT

A tubular protective carrier housing for a length measuring system encased in the carrier housing, the housing having a longitudinal axis and comprising two end parts extending from respective sides of a center part, and fastening devices at the center and end parts for affixing the carrier housing to an object, the housing and the object being subject to thermal expansion. To simplify the structure, the carrier housing itself comprises a length equalizing element at the center part for compensating for differences in the thermal expansion of the housing and object.

5 Claims, 3 Drawing Sheets

LENGTH MEASURING SYSTEM

BACKGROUND OF THE INVENTION

1. Field of the Invention

The present invention relates to a length measuring system comprising a scale member and a scanning unit displaceable along the scale member, the scale member and scanning unit being encased in a protective carrier housing, the scale member being connected to the housing in a manner permitting a relative longitudinal displacement, for example by an elastic connection, and fastening devices affixing the center and end parts of the carrier housing to an object, such as a machine bed. Differences in the thermal expansion of the object and carrier housing are compensated by length equalizing elements.

2. Description of the Prior Art

Published European patent application No. 110,059 discloses such a length measuring system. The disclosed structure is designed to prevent a displacement or to permit only a negligible displacement of the reference point on the scale member, which is usually at the center thereof, relative to the associated reference point of the object to which the carrier housing is affixed, for example the measuring zero point of a machine. This system uses the connection of the scale member, which is usually made of glass, to the carrier housing, which may be made of aluminum, by means of an adhesive of high elasticity, as disclosed in German patent No. 2,643,304, the scale member being disposed flat on a thin adhesive coating and the center of the scale member being fixed by an adhesive of less elasticity. To compensate for differences in the thermal expansion of the object and the carrier housing, fastening devices incorporating length equalizing elements according to German patent No. 2,853,771 are used to affix the ends of the carrier housing to the object. This permits a longitudinal displacement of the carrier housing ends relative to the fastening points of the fastening devices. The length equalizing elements in the fastening devices may take various forms. The displaceable construction produces an expensive and somewhat unstable structure of the end fastening devices, and sometimes substantially increases the length of the measuring system because of the space required for the length equalizing elements in the fastening devices. It also produces an unfavorable movement when the temperature rises, which usually occurs faster than cooling, the increase in temperature causing the parts of the carrier housing which expand more strongly than the object to move apart from the center zero point. If the machine support is uneven and the end fastening devices for the carrier housing are not exactly aligned with the center fastening device, resultant torsions in the fastening devices may interfere with the functioning of the length equalizing elements.

SUMMARY OF THE INVENTION

It is the primary object of this invention to overcome these disadvantages and to provide a length measuring system which is not only simple but will dependably retain the zero position of the scale member encased in the carrier housing even when the object to which the housing is fastened and the carrier housing itself are subject to different thermal expansions.

The above and other objects are accomplished according to the invention with a tubular protective carrier housing for a length measuring system encased in the carrier housing, the housing having a longitudinal axis and comprising two end parts extending from respective sides of a center part, fastening devices at the center and end parts for affixing the carrier housing to an object, the housing and the object being subject to thermal expansion, and the carrier housing comprising a length equalizing means at the center part for compensating for differences in the thermal expansion of the housing and object. In the illustrated embodiments, the length equalizing means is formed in the carrier housing.

Conventional end closures optionally combined with end bearing blocks may be used at the ends of the carrier housing, and the center part of the carrier housing may also be affixed with conventional fastening devices which have been used for long scale members to fix their centers in position. A relative lengthening of the carrier housing due to thermal expansion may lead to a longitudinal displacement of the corresponding carrier housing part towards the center, which displacement is, of course, small, so that there is a tendency to exert pressure on the encased scale member itself through the elastic adhesive connecting it to the carrier housing. During cooling of the carrier housing, on the other hand, little tension will normally be applied because the cooling proceeds much more slowly.

The length equalizing means may be aligned with the fastening device at the center part and is so connected that the longitudinal displacement may be effected within the length equalizing means. The fastening device comprises a respective fastening element engaging the carrier housing at each side of the length equalizing means.

According to a presently preferred embodiment, the length equalizing means comprises a respective length equalizing element at each side of the fastening device at the center part. This is based on the fact that the expansion, i.e. change in the length, of the carrier housing at center part which is fastened to the object is so small that no disturbing forces will be produced by any change in the length of the center part between the fastening points at each side thereof.

Starting from the center, several length equalizing elements may be spaced along the carrier housing and a respective fastening device may be positioned between each pair of length equalizing elements for affixing the carrier housing to the object. With an incremental length measuring scale member, each fastening device may be associated with a reference mark on the scale member. Using such a plurality of length equalizing elements in the center part of the carrier housing produces a more favorable distribution of the relatively small variations in the length during thermal expansion.

According to one specific embodiment, the length equalizing means is constituted by weakened carrier housing portions reducing the longitudinal rigidity of the housing, which weakened carrier housing portions may be filled with an elastically yielding material. Such weakened portions may be provided proximate the center part of the carrier housing, which is supported by a fastening device, with substantially reducing the rigidity of the housing against flexing. For example, the weakened carrier housing portions may be groove-like recesses in the surface of the carrier housing, the recesses extending obliquely to the longitudinal axis and parallel to each other whereby the weakened carrier housing portions assume the form of expanded metal.

The length equalizing elements may also be extension elements inserted between the center part and the end parts of the carrier housing. Such extension elements must retain the linearity of the tubular carrier housing, however.

Finally, the carrier housing may be divided into the center and end parts, the parts having ends facing each other and being connected by interdigitating and overlapping flanges defining recesses permitting longitudinal movement between the carrier housing parts to constitute the length equalizing means. Elastic sealing inserts may be placed in the recesses.

BRIEF DESCRIPTION OF THE DRAWING

The above and other objects, advantages and features of the present invention will become more apparent from the following detailed description of certain now preferred embodiments thereof, taken in conjunction with the accompanying, somewhat diagrammatic drawing wherein.

DETAILED DESCRIPTION OF PREFERRED EMBODIMENTS

Figure 1:
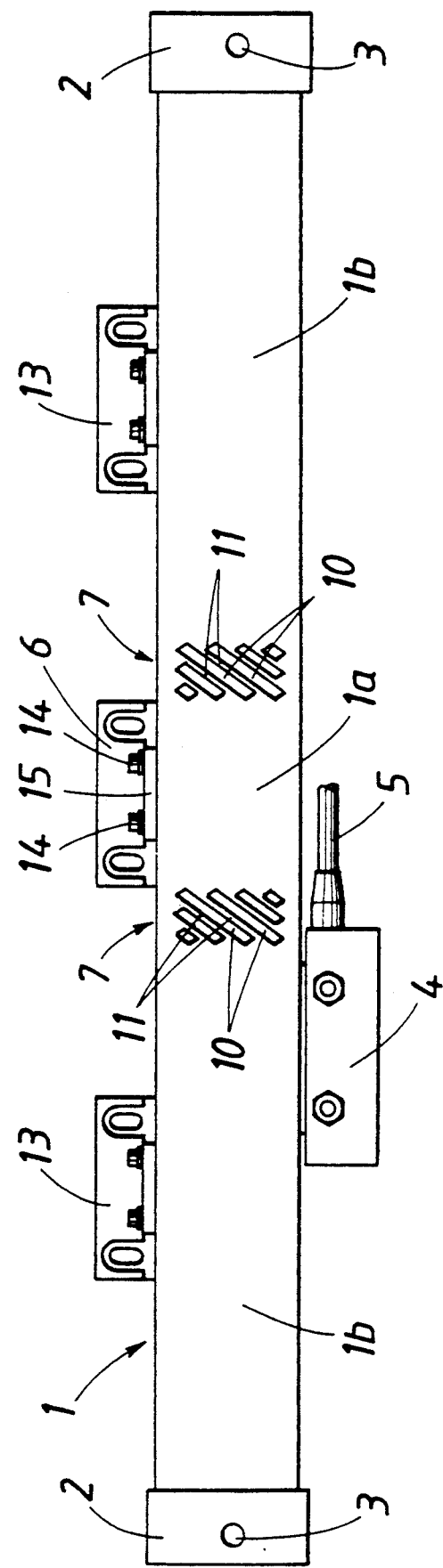
FIGS. 1 to 3 show three embodiments of a length measuring apparatus according to this invention, in elevational views.

In all FIGURES of the drawing, like reference numerals designate like parts operating in a like manner. The illustrated length measuring apparatus comprises a tubular protective carrier housing 1 for a scale member equipped with a measuring scale. The scale member is preferably made of glass. As is known, the tubular protective carrier housing preferably has in its interior a reinforced upper carrier portion defining a groove which receives an edge of the scale member with some play, elastic connecting elements being arranged between the scale member and the groove walls, which permit small length adjustments between the scale member and the carrier housing 1. Reduced ends of bearing blocks 2 are engaged in the opposite ends of tubular protective carrier housing 1, and these end connections may be sealed by suitable sealing elements so that the interior of the housing is hermetically sealed. The bearing blocks have tapped bores 3 which may receive fastening screws for fastening the carrier housing rigidly, i.e. non-displaceably in the longitudinal direction, to an object.

A scanning unit is longitudinally displaceably arranged for guidance along the scale member. The scanning unit may be an optoelectronic scanning device equipped with illuminating means, scanning gratings and photoelectric receivers. If the scale member is an incremental scale, the scanning unit will generate analog scanning signals as it is moved along the measuring scale and scans the same, and these signals may be converted to digital countable signals so that the measurement is effected by the countable signals which depend on the longitudinal displacement of the scanning unit from a given reference point. In addition to the incremental measuring scale, one or more reference marks may be provided for generating reference signals, and the measurement may be related to one of the reference marks.

If an absolute scale member is used, which is usually a coded scale member, an optoelectronic scanning will generate measuring signals indicating directly the absolute position of the scanning unit with respect to the scale member. In addition to optoelectronic scanning units, scanning units operating on capacitative or inductive scanning principles may be used in connection with suitably constructed scale members. The scanning unit is connected by a sword-like element with entraining carrier 4, the sword-like element extending out of carrier housing 1 through a slot in the housing between sealing lips. Cable 5 transmits the measuring or countable signals to a processing and analyzing unit. Length measuring systems of this type are conventional.

According to the invention, central part 1a of carrier housing 1 is rigidly affixed to an object, which is usually a machine, by fastening device 6 illustrated as fastening flange 15 and screws 14. Length equalizing elements 7, 8 or 9 are arranged at both sides, i.e. to the right and left, of central fastening device 6. These length equalizing elements compensate for differences in the thermal expansion of the carrier housing and the object. They permit the two end parts 1b left and right of central part ia of carrier housing 1 to be longitudinally displaced.

Length equalizing elements 7 of the embodiment of FIG. 1 are formed by parallel, groove-forming recesses 10 extending obliquely to the longitudinal axis of the carrier housing in the surface of the housing carrier and leaving very narrow webs 11 therebetween. The recesses in the carrier housing surface do not penetrate into the interior of the tubular protective carrier housing so that the inner surface of the tubular carrier housing remains unchanged and sealed. These length equalizing elements operate like an expanded metal or metal mesh structure imparting to the tubular carrier housing a substantially reduced longitudinal rigidity in the area of the elements while retaining the shape of the carrier housing. In this way, a longitudinal compensation or equalization is obtained without causing a lateral displacement of the carrier housing parts in relation to each other. Recesses 10 may be filled with an elastic putty and other suitable elastic material.

Figure 2:
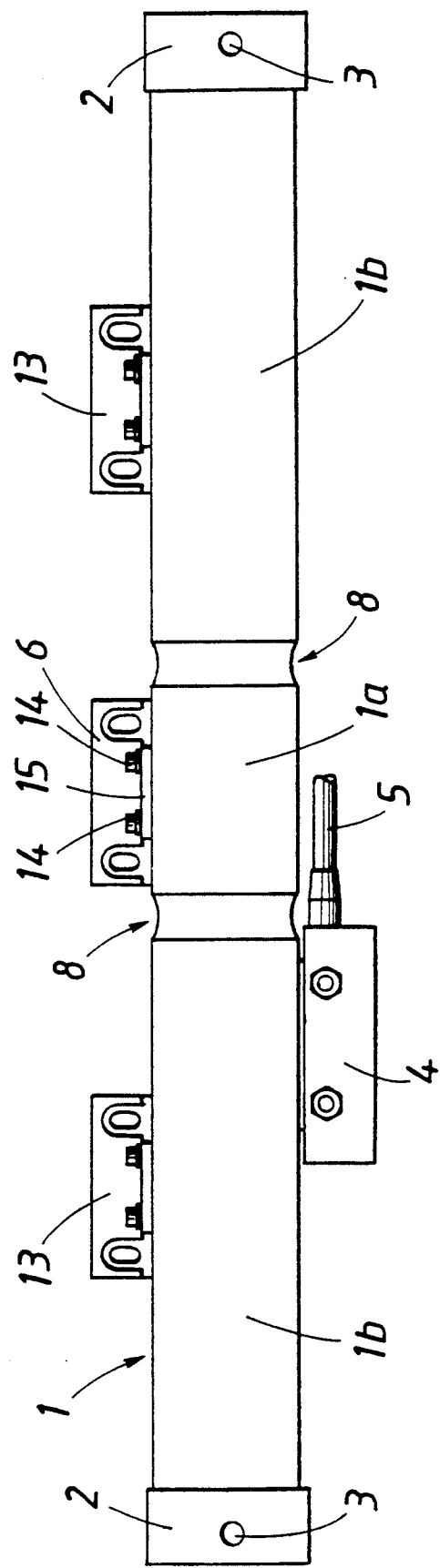

In the embodiment of FIG. 2, length equalizing elements 8 are comprised of extension elements arranged between central part 1a and end parts 1b of the tubular protective carrier housing. These elements operate like a bellows. Elements 8 may simply be formed by annular grooves extending perpendicularly to the longitudinal axis in the surface of the carrier housing but not penetrating into the interior of the tubular carrier housing. These grooves may also be filled with a suitable elastic material.

Figure 3:
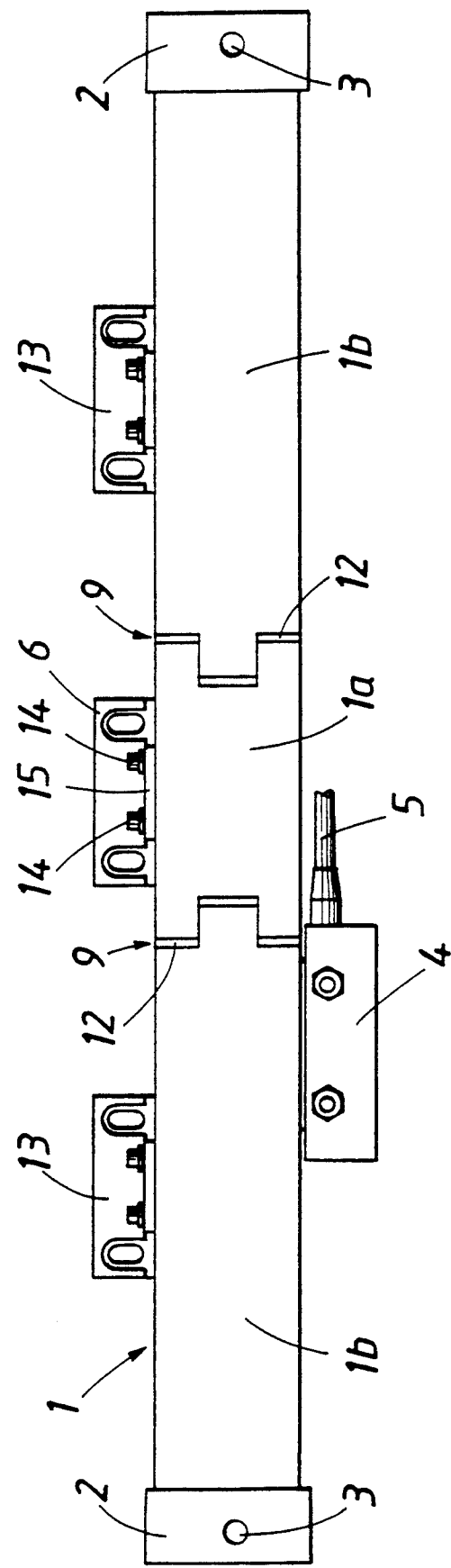

Length equalizing elements 9 of the embodiment of FIG. 3 are constituted by staggered recesses 12 extending perpendicularly to the longitudinal axis in the surface of carrier housing 1 but not penetrating into the interior of the tubular carrier housing. The carrier housing is divided into the center and end parts, the parts having ends facing each other and being connected by interdigitating and overlapping flanges defining the recesses, which permit longitudinal movement between the carrier housing parts 1a, 1b to constitute length equalizing means 9. Again, these recesses may be filled with an elastic material, such as putty or a silicone mass. The carrier housing parts 1a and 1b are completely separated from each other by recesses 12 which are staggered from each other in the longitudinal direction so that they permit a longitudinal displacement of end parts 1b relative to central part 1a but no lateral displacement of the carrier housing parts with respect to each other.

As shown in the drawing, additional fastening devices 13 for rigidly affixing carrier housing 1 to an object may be provided in the case of relatively long length measuring systems. In this case, it is also possible to omit the insertion of fastening screws in bores 3 of end bearing blocks 2 so that length equalizing elements 7, 8, 9 will provide for a length compensation between central fastening device 6 and additional fastening devices 13 on each side thereof while the ends of the carrier housing projecting beyond fastening devices 13 will be able to expand freely in the longitudinal direction.

In all embodiments, central part 1a of carrier housing 1 will remain non-displaceably fixed to the object by fastening device 6 and length equalizing elements 7, 8, 9 will absorb any thermal expansions and displace end housing parts 1b longitudinally.

It is possible in all embodiments to arrange length equalizing elements 7, 8, 9 in the center of carrier housing 1, instead of placing them on each side of fastening device 6, so that the length equalizing element at the center of the carrier housing will connect the two carrier housing end parts 1b. In this case, screws 14 of fastening device 6, which connect the carrier housing to the object, will be positioned at respective sides, i.e. to the right and left, of the centrally arranged length equalizing element and attachment flange 15 will have a length equalizing element arranged centrally between fastening screws 14. This length equalizing element may simply be a slot extending transversely to the longitudinal axis of the carrier housing in the attachment flange. Other suitable length equalizing elements may also be used.

What is claimed is:

1. A tubular protective carrier housing for a length measuring system encased in the carrier housing, the housing having a longitudinal axis and comprising two end parts extending from respective sides of a center part, fastening devices at the center and end parts for rigidly affixing the carrier housing to an object, the housing and the object being subject to thermal expansion, and a length equalizing means for compensating for differences in the thermal expansion of the housing and object only at the center part, the carrier housing and the length equalizing means for compensating for differences in the thermal expansion of the housing and object being of one-piece construction.

2. The tubular protective carrier housing of claim 1, wherein the length equalizing means comprises a respective length equalizing element at each side of the fastening device at the center part.

3. The tubular protective carrier housing of claim 1, comprising additional fastening devices affixing the carrier housing to the object at each side of the length equalizing means.

4. A tubular protective carrier housing for a length measuring system encased in the carrier housing, the housing having a longitudinal axis and comprising two end parts extending from respective sides of a center part, fastening devices at the center and end parts for rigidly affixing the carrier housing to an object, the housing and the object being subject to thermal expansion, and a length equalizing means for compensating for differences in the thermal expansion of the housing and object only at the center part, the carrier housing and the length equalizing means for compensating for differences in the thermal expansion of the housing and object being of one-piece construction, the length equalizing means being constituted by weakened carrier housing portions reducing the longitudinal rigidity of the housing, and the weakened carrier housing portions being groove-like recesses in the surface of the carrier housing, the recesses extending obliquely to the longitudinal axis and parallel to each other whereby the weakened carrier housing portions assume the form of expanded metal.

5. A tubular protective carrier housing for a length measuring system encased in the carrier housing, the housing having a longitudinal axis and being divided into a center part and two end parts extending from respective sides of the center part, fastening devices at the center and end parts for rigidly affixing the carrier housing to an object, the housing and the object being subject to thermal expansion, and the carrier housing parts having ends facing each other and being connected by interdigiting and overlapping flanges defining recesses permitting longitudinal movement between the carrier housing parts to constitute a length equalizing means for compensating for differences in the thermal expansion of the housing and object only at the center part, the carrier housing and the length equalizing means for compensating for differences in the thermal expansion of the housing and object being of one-piece construction.

* * * * *